(12) United States Patent  
Kawahata et al.

(10) Patent No.: US 8,279,295 B2  
(45) Date of Patent: Oct. 2, 2012

(54) IMAGE DELIVERY APPARATUS, IMAGE DELIVERY SYSTEM, IMAGE DELIVERY METHOD AND PROGRAM

(75) Inventors: Satoshi Kawahata, Kanagawa (JP); Yasuto Masuda, Kanagawa (JP); Takehiko Sasaki, Kanagawa (JP)

(73) Assignee: Sony Corporation (JP)

( * ) Notice: Subject to any disclaimer, the term of this patent is extended or adjusted under 35 U.S.C. 154(b) by 374 days.

(21) Appl. No.: 12/653,438

(22) Filed: Dec. 14, 2009

(65) Prior Publication Data

US 2010/0157068 A1    Jun. 24, 2010

(30) Foreign Application Priority Data

Dec. 19, 2008 (JP) ................ P2008-324230

(51) Int. Cl.  
*H04N 3/14* (2006.01)

(52) U.S. Cl. .................................. 348/211.3

(58) Field of Classification Search ............. 348/211.3  
See application file for complete search history.

(56) References Cited

U.S. PATENT DOCUMENTS

| 2003/0189649 A1* | 10/2003 | Kuno ................. 348/211.1 |
| 2004/0174443 A1* | 9/2004 | Simske .............. 348/231.3 |
| 2009/0198661 A1* | 8/2009 | Miyajima et al. ........ 707/3 |

FOREIGN PATENT DOCUMENTS

JP    2006-191411 A    7/2006

* cited by examiner

*Primary Examiner* — James Hannett  
(74) *Attorney, Agent, or Firm* — Lerner, David, Littenberg, Krumholz & Mentlik, LLP

(57) ABSTRACT

There is provided an image delivery apparatus including a camera capable of changing a shooting condition specified by at least a shooting direction, a camera controller that causes the camera to shoot image shots corresponding to a plurality of shooting conditions in a predetermined period according to a shooting pattern containing the plurality of mutually different shooting conditions and having the predetermined period, an image storage that stores data of image shots shot corresponding to the plurality of shooting conditions and updated in the predetermined period, an operation information receiver that receives operation information indicating any shooting condition contained in the shooting pattern from image reproducing apparatuses, and an image delivery unit that delivers data of image shots corresponding to the shooting condition indicated by the operation information received from each of the image reproducing apparatuses and updated in the predetermined period to each of the image reproducing apparatuses.

4 Claims, 15 Drawing Sheets

1

IMAGE DELIVERY APPARATUS, IMAGE DELIVERY SYSTEM, IMAGE DELIVERY METHOD AND PROGRAM

CROSS-REFERENCE TO RELATED APPLICATION

The present application claims priority from Japanese Patent Application No. JP 2008-324230 filed in the Japanese Patent Office on Dec. 19, 2008, the entire content of which is incorporated herein by reference.

BACKGROUND OF THE INVENTION

1. Field of the Invention

The present invention relates to an image delivery apparatus, an image delivery system, an image delivery method, and a program.

2. Description of the Related Art

A system that delivers a real-time image (video) shot under desired conditions for shooting to an image reproducing apparatus by allowing a user to control a camera in a remote place via a network is known. Here, if the system is used by a plurality of users, the control right is granted only to a single user. Thus, while a user having the control right can check a desired image, a user having no control right may not be able to check a desired image.

Therefore, as described in Japanese Patent Application Laid-Open No. 2006-191411, a system that delivers images desired by each user to a plurality of image reproducing apparatuses regardless of the control right of camera by performing image processing of a partial image of a wide-angle image shot is proposed.

SUMMARY OF THE INVENTION

However, according to the system described in Japanese Patent Application Laid-Open No. 2006-191411, it is difficult to deliver a high-quality image to image reproducing apparatuses because image processing (such as distortion corrections and enlargement) of a partial image of a wide-angle image shot is performed.

Thus, it is desirable to provide an image delivery apparatus, an image delivery system, an image delivery method, and a program capable of delivering a high-quality image desired by each user to a plurality of image reproducing apparatuses.

According to a first embodiment of the present invention, there is provided an image delivery apparatus, including a camera unit capable of changing a shooting condition specified by a shooting direction and/or an angle of view, a camera control unit that causes the camera unit to shoot image shots corresponding to a plurality of shooting conditions in a predetermined period according to a shooting pattern containing the plurality of mutually different shooting conditions and having the predetermined period, an image storage unit that stores data of image shots shot corresponding to the plurality of shooting conditions and updated in the predetermined period, an operation information receiving unit that receives operation information indicating any shooting condition contained in the shooting pattern from one image reproducing apparatus or more, and an image delivery unit that delivers data of image shots corresponding to the shooting condition indicated by the operation information received from each of the image reproducing apparatuses and updated in the predetermined period to each of the image reproducing apparatuses.

According to the above configuration, data of image shots shot corresponding to the plurality of shooting conditions contained in the shooting pattern and updated in the predetermined period is stored. Then, data of image shots corresponding to the shooting condition indicated by operation information received from each image reproducing apparatus and updated in the predetermined period is delivered to each image reproducing apparatus. Accordingly, high-quality images desired by each user can be delivered to a plurality of image reproducing apparatuses regardless of the control right to the image delivery apparatus.

The image delivery apparatus may include a shooting pattern change unit that predicts the operation information that could be received from the image reproducing apparatuses based on the operation information received from the image reproducing apparatuses and changes the shooting pattern so that the shooting condition indicated by the predicted operation information is included. Accordingly, shooting of image shots, storage of image shot data, and delivery of image shots can efficiently be carried out according to a shooting pattern changed so as to contain a shooting condition assumed to be desired by a user.

The shooting pattern may include a plurality of shooting conditions set in such a way that after the shooting direction being changed by a predetermined angle at a time between an upper limit and a lower limit of a changeable range of the shooting direction at a first angle of view, the shooting direction is changed by the predetermined angle at a time between the upper limit and the lower limit of the changeable range of the shooting direction at a second angle of view that is different from the first angle of view.

According to a second embodiment of the present invention, there is provided an image delivery system including an image delivery apparatus according to the first embodiment and one image reproducing apparatus or more.

According to a third embodiment of the present invention, there is provided an image delivery method, comprising the steps of shooting image shots corresponding to a plurality of shooting conditions in a predetermined period according to a shooting pattern containing the plurality of shooting conditions involving a change of a shooting direction and/or an angle of view and having the predetermined period, storing data of image shots shot corresponding to the plurality of shooting conditions and updated in the predetermined period, receiving operation information indicating any shooting condition contained in the shooting pattern from one image reproducing apparatus or more, and delivering data of image shots corresponding to the shooting condition indicated by the operation information received from each of the image reproducing apparatuses and updated in the predetermined period to each of the image reproducing apparatuses.

According to the above method, high-quality images desired by each user can be delivered to the plurality of image reproducing apparatuses regardless of the control right to the image delivery apparatus.

According to a fourth embodiment of the present invention, there is provided a program for causing a computer to execute an image delivery method according to the third embodiment.

According to the embodiments of the present invention described above, there can be provided an image delivery apparatus, an image delivery system, an image delivery method, and a program capable of delivering a high-quality image desired by each user to a plurality of image reproducing apparatuses.

DETAILED DESCRIPTION OF EMBODIMENT

Figure 1:
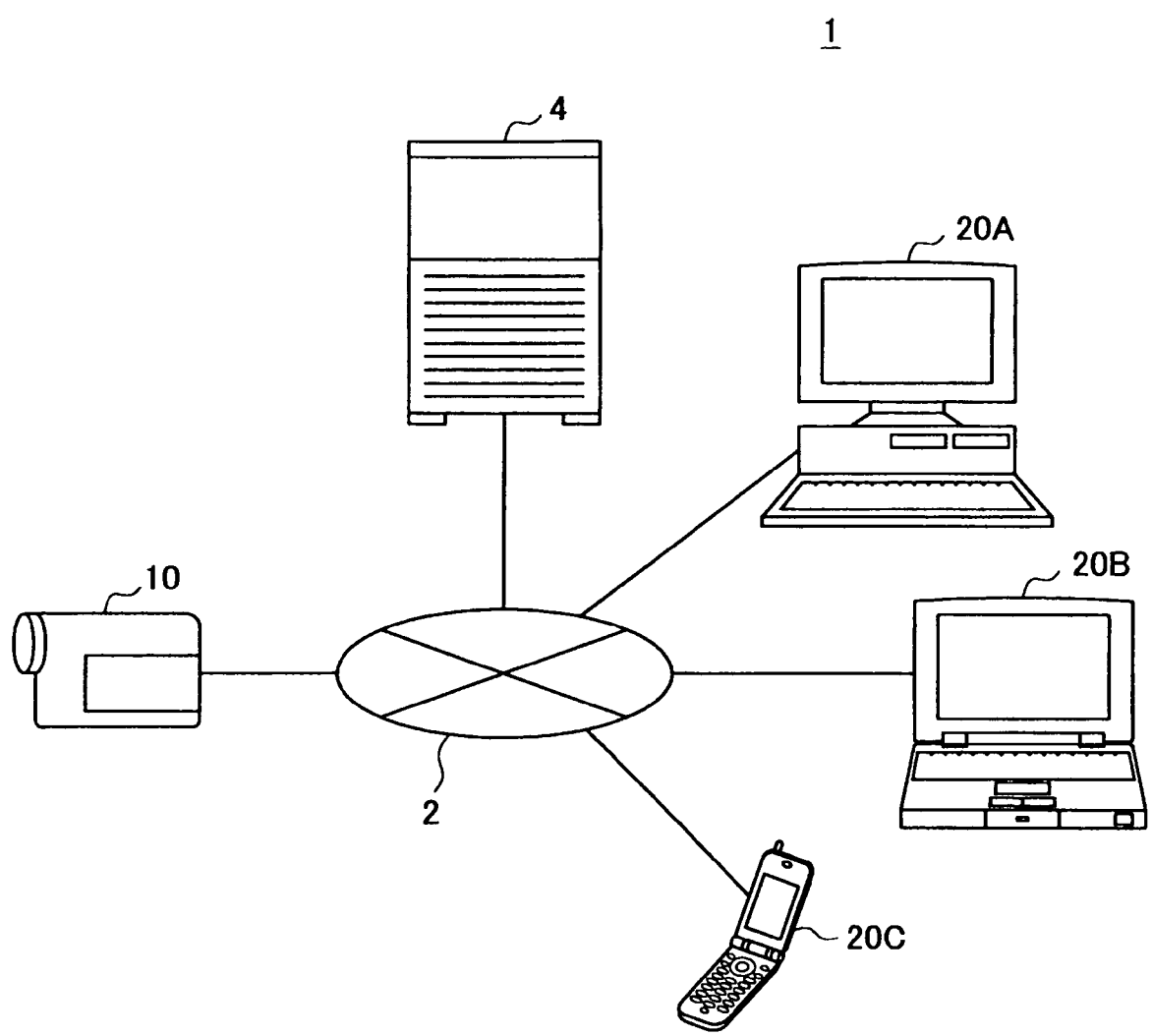
FIG. 1 is a block diagram showing the configuration of an image delivery system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Configuration of an Image Delivery System 1]

First, the image delivery system 1 according to an embodiment of the present invention will be described with reference to FIG. 1. FIG. 1 is a block diagram showing the configuration of the image delivery system 1 according to an embodiment of the present invention.

As shown in FIG. 1, the image delivery system 1 includes a communication network 2, an SIP (Session Initiation Protocol) server 4, an IP (Internet Protocol) camera (image delivery apparatus) 10, and user terminals (image reproducing apparatuses) 20 (20A, 20B, 20C).

The communication network 2 is a wire and/or wireless communication network that bi-directionally or uni-directionally communicably connects the SIP server 4, the IP camera 10, and the user terminals 20.

The SIP server 4 executes call control such as the start and end of a communication session using SIP for media communication between the IP camera 10 and the user terminals 20.

The IP camera 10 includes a camera capable of changing a shooting condition specified by the shooting direction (the panning angle and/or the tilt angle) and/or the angle of view (zoom power). The IP camera 10 shoots images according to a shooting pattern having a predetermined period (hereinafter, referred to also as a shooting period) and then generates and stores image shot data. Here, the shooting pattern includes a plurality of mutually different shooting conditions involving changes of the shooting direction and/or the angle of view. The IP camera 10 shoots images corresponding to the plurality of shooting conditions and delivers image shot data updated in each shooting period to the user terminal 20.

The user terminal 20 receives image shot data shot under shooting conditions desired by the user and updated in each shooting period to reproduce images. Here, the user terminal 20 may be a personal computer or an information home appliance product having a network communication function such as a TV set, mobile phone, PDA (Personal Digital Assistant), digital camera, digital video camera, home game machine, and mobile video/audio player.

While the single IP camera 10 is connected to the communication network 2 in FIG. 1, a plurality of the IP cameras 10 may be connected. Similarly, three user terminals A to C are connected to the communication network 2 in FIG. 1, but one unit, two units, or four or more units of the user terminal 20 may be connected.

Here, a basic operation of the image delivery system 1 will be described. The IP camera 10 shoots images under a plurality of shooting conditions according to a shooting pattern and then generates and stores image shot data. The IP camera 10 repeats shooting of images and storage of image shot data in each shooting period to store image shot data corresponding to the plurality of shooting conditions contained in the shooting pattern of at least one shooting period. Accordingly, image shot data shot under the plurality of shooting conditions and updated in each shooting period is stored in the IP camera 10.

The user terminal 20 establishes a session with the IP camera 10 to receive delivery of real-time images (video) from the IP camera 10. The user terminal 20 initiates a session with the IP camera 10 by transmitting a session initiation request to the IP camera 10 via the SIP server 4 and receiving an initiation response and similarly ends a session by transmitting a session end request and receiving an end response.

If a session with the user terminal 20 is initiated, the IP camera 10 sets operation information of the user terminal 20 and, if operation information is received from the user terminal 20, the IP camera 10 updates the operation information of the user terminal 20. The IP camera 10 delivers image shot data updated in each shooting period corresponding to shooting conditions indicated by the operation information of the user terminal 20 until the session with the user terminal 20 ends.

The user terminal 20 provides image shots updated in each shooting period to the user by receiving and reproducing image shot data updated in each shooting period. Accordingly, the user can check a desired image shot substantially in real time regardless of the control right of the IP camera 10.

First Embodiment

The image delivery system 1 according to the first embodiment of the present invention will be described below.

[2-1. Configuration of the IP Camera 10]

Figure 2:
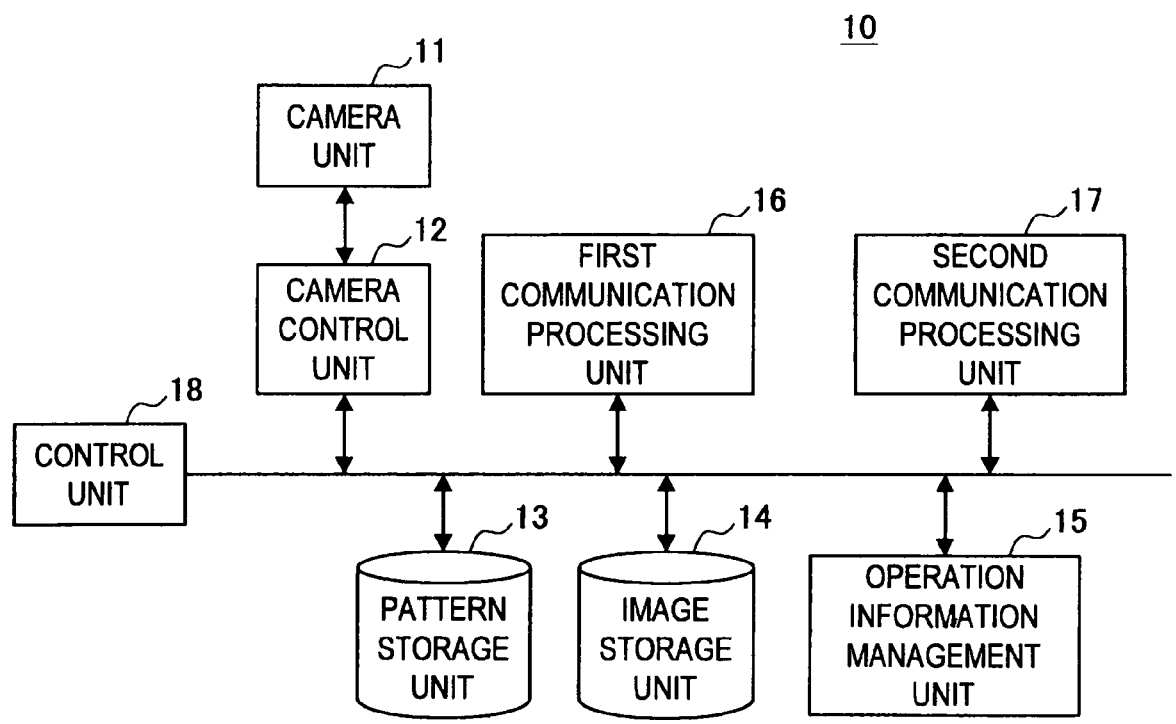
FIG. 2 is a block diagram showing main functional configurations of an IP camera according to a first embodiment.

The IP camera 10 according to the first embodiment of the present invention will be described with reference to FIG. 2. FIG. 2 is a block diagram showing main functional configurations of the IP camera 10 according to the first embodiment.

As shown in FIG. 2, the IP camera 10 includes a camera unit 11, a camera control unit 12, a pattern storage unit 13, an image storage unit 14, an operation information management unit 15, a first communication processing unit 16, a second communication processing unit 17, and a control unit 18.

The camera unit 11 has a panning mechanism and can change the shooting direction in the panning angle range of, for example, −90° to +90° in the horizontal direction. The camera unit 11 has a zooming adjustment function and can change the angle of view in the angle of view range of, for example, 10° to 40°. While the camera unit 11 described below has the panning mechanism and zooming adjustment function, the camera unit 11 may have the panning mechanism, tilt mechanism, and zooming adjustment function, the panning mechanism and/or tilt mechanism only, or the zooming adjustment function only.

The camera unit 11 shoots images under the plurality of shooting conditions involving changes of the shooting direction and/or the angle of view and generates image shot data before outputting the data to the image storage unit 14. The camera unit 11 has automatic control circuits of the focus, exposure, shutter speed and the like and a function to shoot an optimum image by controlling an optical system.

The camera control unit 12 causes the camera unit to shoot image shots corresponding to the plurality of shooting conditions according to a shooting pattern in each shooting period. The camera control unit 12 controls the panning mechanism and zooming adjustment function of the camera unit 11 so as to meet each shooting condition contained in the shooting pattern. The camera control unit 12 controls the camera unit 11 so that the camera unit 11 shoots image shots corresponding to each shooting condition and generates and outputs image shot data to the image storage unit 14.

The pattern storage unit 13 stores the shooting pattern containing the plurality of shooting conditions involving changes of the shooting direction and/or the angle of view. Shooting conditions are defined by a plurality of panning angles set in stages in the panning angle range and/or a plurality of angles of view set in stages in the angle of view range. A shooting pattern, which will be described later, is set in such a way that, for example, after the panning angle being changed in stages at some angle of view, the panning angle is changed in stages at another angle of view in each shooing period.

The image storage unit 14 stores image shot data corresponding to the plurality of shooting conditions. The image storage unit 14 stores image shot data corresponding to the plurality of shooting conditions contained in the shooting pattern of at least one shooting period. Incidentally, the image storage unit 14 may be provided as an image storage server or the like connected to the communication network 2 separately from the IP camera 10. In such a case, image shot data is output to the image storage server via an output IF (not shown).

The operation information management unit 15 manages operation information received from the user terminals 20 as an operation information list T by associating with each of the user terminals 20. Here, operation information is information indicating shooting conditions (for example, the panning angle and angle of view) desired by the user.

The first communication processing unit 16 performs communication with the SIP server 4 via the communication network 2 to establish a communication session with the user terminal 20 to be a delivery destination of image shots. The first communication processing unit 16 transmits/receives a call control signal to initiate/end a session to/from the SIP server 4 via the communication network 2. The first communication processing unit 16 initiates a session with the user terminal 20 by transmitting a session initiation response to a session initiation request received via the SIP server 4 and similarly ends the session by transmitting a session end response to a session end request.

The second communication processing unit 17 performs communication with the user terminal 20 via the communication network 2. The second communication processing unit 17 receives operation information and the like from the user terminal 20 via the communication network 2. The second communication processing unit 17 packetizes compressed and encoded image shot data using a predetermined compression format by an encoding unit (not shown) before delivering the packetized data to the user terminal 20.

The control unit 18 includes a CPU, ROM, RAM and the like and performs processing necessary for operation of the IP camera 10 and controls each unit connected through a bus. The CPU reads an image delivery program from the ROM and expands the program in the RAM for execution. The control unit 18 controls each unit so that image shot data corresponding to shooting conditions indicated by operation information of each of the user terminals 20 is read and delivered to each of the user terminals 20 after being compressed and encoded in each shooting period.

[2-2. Configuration of the User Terminal 20]

Figure 3:
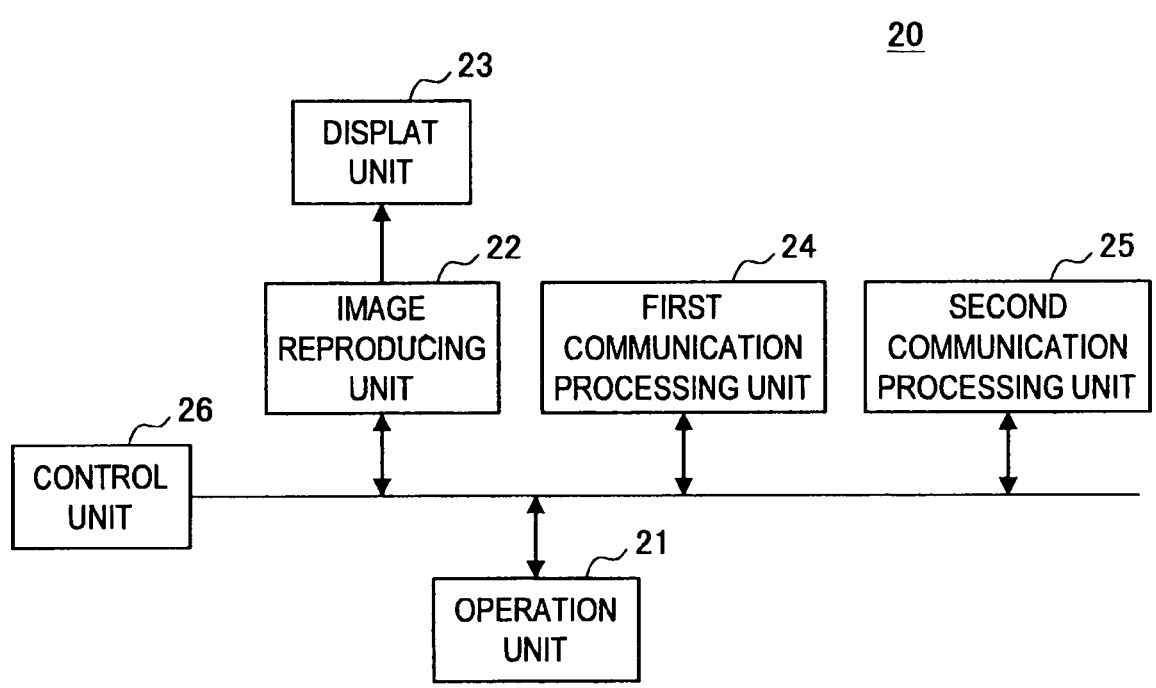
FIG. 3 is a block diagram showing the main functional configurations of a user terminal.

Next, the user terminal 20 according to an embodiment of the present invention will be described with reference to FIG. 3. FIG. 3 is a block diagram showing the main functional configurations of the user terminal 20.

As shown in FIG. 3, the user terminal 20 includes an operation unit 21, an image reproducing unit 22, a display unit 23, a first communication processing unit 24, a second communication processing unit 25, and a control unit 26.

The operation unit 21 includes an operating button, pointing device, touch panel or the like and causes the user to input operating information indicating a start/end instruction of image delivery and a desired shooting condition. The operation unit 21 outputs a start/end instruction of image delivery or an update instruction of operation information to the control unit 26. The image reproducing unit 22 reproduces image shot data delivered from the IP camera 10 and decoded by a decoding unit (not shown) and outputs the data to the display unit 23.

The display unit 23 includes a liquid crystal panel, monitor or the like and displays image shots corresponding to image shot data output from the image reproducing unit 22 and a GUI (Graphical User Interface) 30 of the image reproducing program described later. While the display unit 23 is provided integrally with the user terminal 20 in FIG. 3, the display unit 23 may be provided separately from the user terminal 20. In such a case, image shot data is output to a display apparatus via an output IF (not shown).

The first communication processing unit 24 performs communication with the SIP server 4 via the communication network 2 to establish a communication session with the IP camera 10 to be a delivery source of image shots. The first communication processing unit 24 transmits/receives a call control signal to initiate/end a session to/from the SIP server 4 via the communication network 2. The first communication processing unit 24 initiates a session with the IP camera 10 by receiving a session initiation response from the IP camera 10 via the SIP server 4 and similarly ends the session by receiving a session end response.

The second communication processing unit 25 performs communication processing with the IP camera 10 via the communication network 2. The second communication processing unit 25 transmits operation information and the like to the IP camera 10 via the communication network 2. The second communication processing unit 25 receives packetized image shot data from the IP camera 10 to restore image shot data before being packetized.

The control unit 26 includes a CPU, ROM, RAM and the like and performs processing necessary for operation of the user terminal 20 and controls each unit connected through the bus. The CPU reads the image reproducing program from the ROM and expands the program in the RAM for execution.

The control unit 26 controls each unit so that image shot data corresponding to shooting conditions indicated by operation information of the user terminal 20 is acquired and reproduced to display image shots corresponding to the image shot data in each shooting period.

[2-3. Shooting Pattern]

Figure 4:
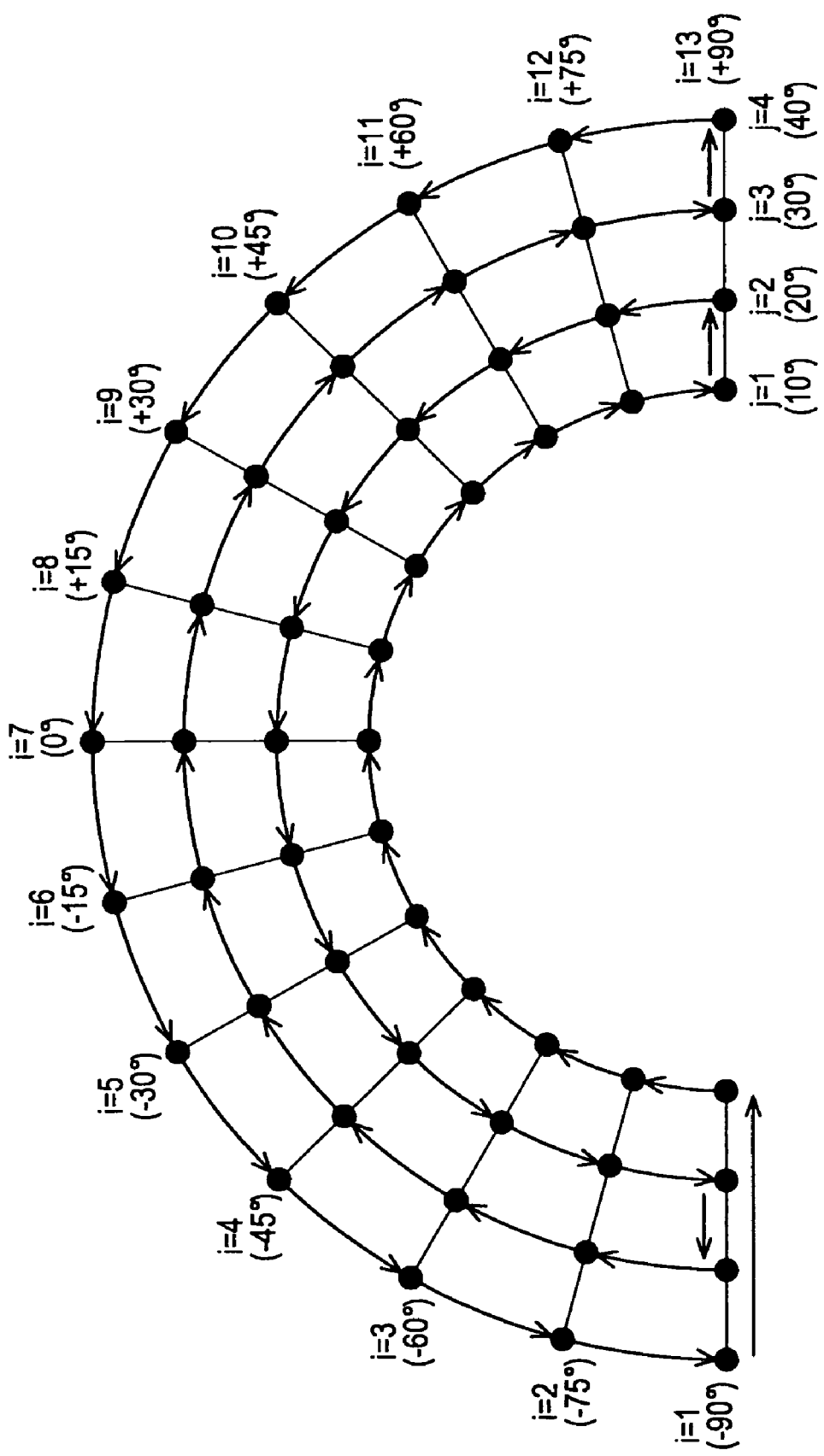
FIG. 4 is a diagram showing an example of a shooting pattern.
Figure 5:
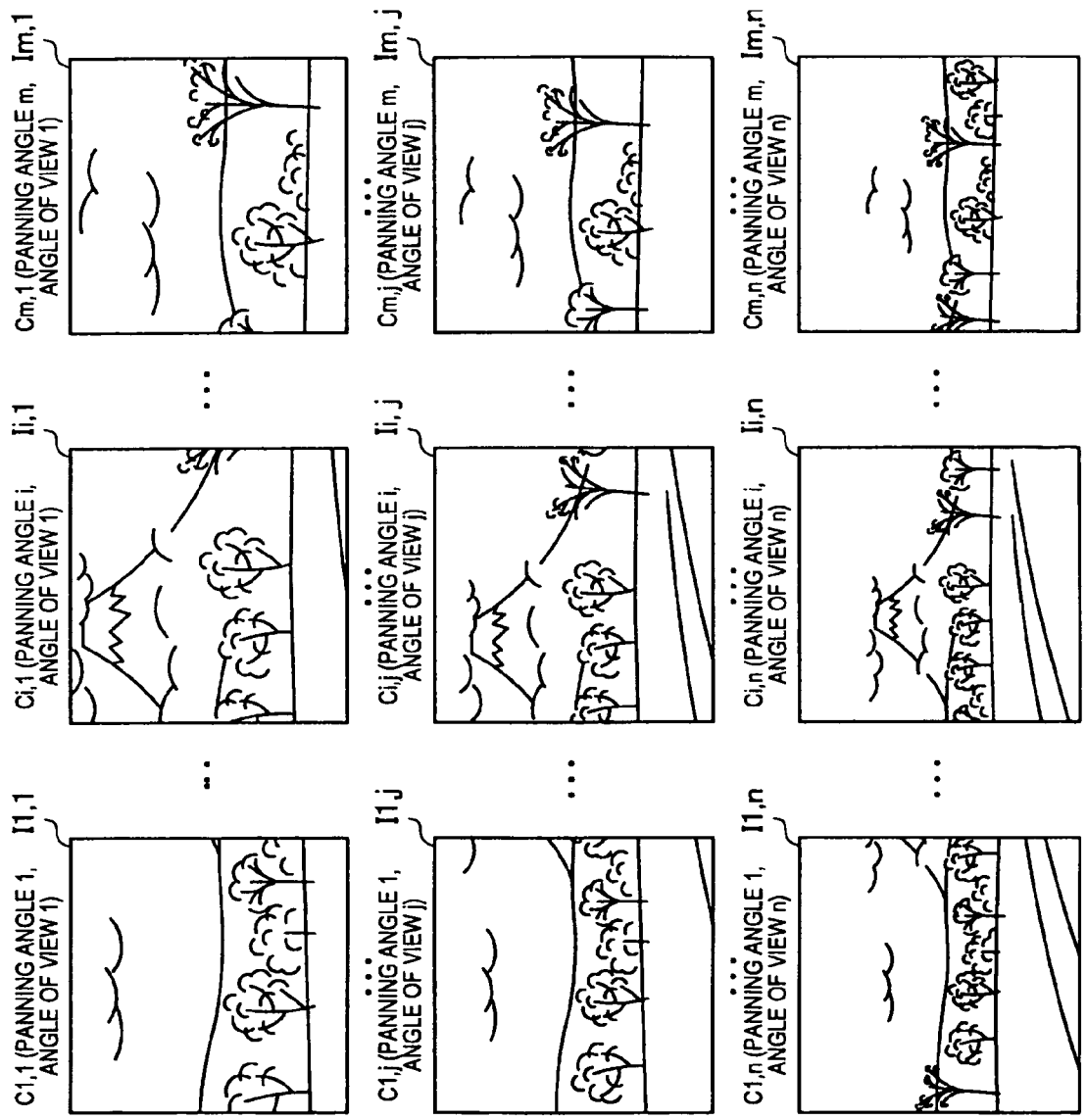
FIG. 5 is a diagram showing examples of image shots corresponding to each shooting condition.

Next, a shooting pattern will be described with reference to FIGS. 4 and 5. FIG. 4 is a diagram showing an example of shooting pattern and FIG. 5 is a diagram showing examples of image shots corresponding to each shooting condition.

A shooting pattern includes the plurality of shooting conditions involving changes of the shooting direction and the angle of view. FIG. 4 shows a case in which the panning angle range is −90° to +90° and the angle of view range 10° to 40°, and the panning angle is changed in 15° and the angle of view in 10°. Shooting conditions are defined by panning angles −90°, −75°, . . . , +90° set as the panning angle i (i=1, 2, . . . , m, m=13) and angles of view 10°, 20°, 30°, and 40° set as the angle of view j (j=1, 2, . . . , n, n=4).

In the shooting pattern shown in FIG. 4, the shooting condition defined by the panning angle i and the angle of view j is illustrated as the shooting condition Ci, j. Thus, for example, the shooting condition defined by the panning angle (−90°) and the angle of view (10°) is illustrated as the shooting condition C1, 1 and the shooting condition defined by the panning angle (+90°) and the angle of view (40°) as the shooting condition C13, 4.

Then, the shooting pattern shown in FIG. 4 is set so that the panning angle is changed to the panning angles 1 to 13 at the angle of view 1, the panning angle is changed to the panning angles 13 to 1 after the angle of view 1 being changed to the angle of view 2, the panning angle is changed to the panning angles 1 to 13 after the angle of view 2 being changed to the angle of view 3, and the panning angle is changed to the panning angles 13 to 1 after the angle of view 3 being changed to the angle of view 4. That is, the camera unit 11 shoots image shots corresponding to the shooting conditions C1, 1, C2, 1, . . . , C13, 1, the shooting conditions C13, 2, C12, 2, . . . , C1, 2, the shooting conditions C1, 3, C2, 3, . . . , C13, 3, and the shooting conditions C13, 4, C12, 4, . . . , C1, 4.

Here, if it is assumed that an average shooting interval necessary between the time when shooting conditions are changed after completing shooting under certain conditions and the time when shooting is completed under the next shooting conditions is 50 ms, it takes 2.6 sec to shoot image shots corresponding to 52 shooting conditions in all with combinations of the angles of view 1 to 4 and the panning angles 1 to 13 in the shooting pattern shown in FIG. 4. Thus, the shooting period in this case will be 2.6 sec.

Then, when the camera unit 11 completes shooting of image shots corresponding to the 52 shooting conditions C1, 1 to C13, 4 in a certain shooting period, the camera unit 11 moves to the next shooting period and starts shooting a image shot corresponding to the shooting condition C1, 1. Accordingly, the camera unit 11 repeats to shoot image shot corresponding to the plurality of shooting conditions contained in the shooting pattern in each shooting period.

FIG. 4 shows only an example of shooting pattern, and the IP camera 10 may shoot image shots according to another shooting pattern to store image shot data. For example, while change intervals of the panning angle and/or the angle of view are each set as a fixed interval in the shooting pattern shown in FIG. 4, change intervals of the panning angle and/or the angle of view may each be set as different intervals. Moreover, the change direction of the panning angle is toggled between clockwise and counterclockwise when the angle of view is changed in the shooting pattern shown in FIG. 4, but the change direction of the panning angle may be set to be fixed.

FIG. 5 shows examples of image shots corresponding to each of shooting conditions. In FIG. 5, image shots I1, 1, Ii, 1, Im, 1 corresponding to the shooting conditions C1, 1, Ci, 1, Cm, 1, image shots I1, j, Ii, j, Im, j corresponding to the shooting conditions C1, j, Ci, j, Cm, j, and image shots I1, n, Ii, n, Im, n corresponding to the shooting conditions C1, n, Ci, n, Cm, n are shown.

Here, if the image shot Ii, j is defined as a reference image, the image shot I1, j corresponds to an image whose angle of view is the same as that of the reference image and whose panning angle is changed to the lower limit of the panning angle range, and the image shot Im, j corresponds to an image whose angle of view is the same as that of the reference image and whose panning angle is changed to the upper limit of the panning angle range. The image shot Ii, 1 corresponds to a wide-angle image whose panning angle is the same as that of the reference image and whose angle of view is changed to the lower limit of the angle of view range, and the image shot Ii, n corresponds to a telephoto image whose panning angle is the same as that of the reference image and whose angle of view is changed to the upper limit of the angle of view range. The image shot Ii, 1 and the image shots I1, 1, Im, 1, and the image shot Ii, n and the image shots I1, n, Im, n are in a relationship similar to that between the image shot Ii, j and the image shots I1, j, Im, j described above.

The image storage unit 14 stores image shot data (I1, 1 to Im, n) corresponding to the plurality of shooting conditions (C1, 1 to Cm, n) contained in the shooting pattern of at least one shooting period. The image storage unit 14 may store image shot data (for example, I1, 1 to Im, n for the first shooting period and I1, 1 to Im, n for the second shooting period) corresponding to the plurality of shooting conditions (C1, 1 to Cm, n) contained in the shooting pattern of two shooting periods or more.

If the shooting period shifts, the image storage unit 14 may store image shot data corresponding to the plurality of shooting conditions contained in the shooting pattern by overwriting. In such a case, the image storage unit 14 has a storage area corresponding to each shooting condition and stores image shot data shot corresponding to the plurality of shooting conditions and updated in each shooting period. Instead of having a storage area corresponding to each shooting condition, the image storage unit 14 may store image shot data corresponding to the plurality of shooting conditions by associating with identification information indicating each shooting condition.

[2-4. Operation Information List T]

Figure 6:
FIG. 6 is a diagram showing an example of an operation information list.

Next, the operation information list T will be described with reference to FIG. 6. FIG. 6 is a diagram showing an example of the operation information list T.

The operation information list T is a list representing operation information of each of the user terminals 20 and is managed by the operation information management unit 15. The operation information list T contains identification information of and operation information of the user terminal 20 having a session established with the IP camera 10. Thus, when a session is initiated with the user terminal 20, the operation information management unit 15 registers initial values of operation information in the operation information list T together with identification information of the user terminal 20 and, when the session ends, the operation information management unit 15 discards or invalidates the identification information and operation information of the user terminal 20 from the operation information list T.

The operation information list T shown in FIG. 6 lists the identification information and operation information of the user terminals A to C. According to the operation information list T, the operation information of the user terminals A to C is "panning angle 0°, angle of view 10° (shooting condition C7, 1)", "panning angle +90°, angle of view 40° (shooting condition C13, 4)", and "panning angle −90°, angle of view 20° (shooting condition C1, 2)" respectively.

[2-5. The GUI 30 of the Image Reproducing Program]

Figure 7:
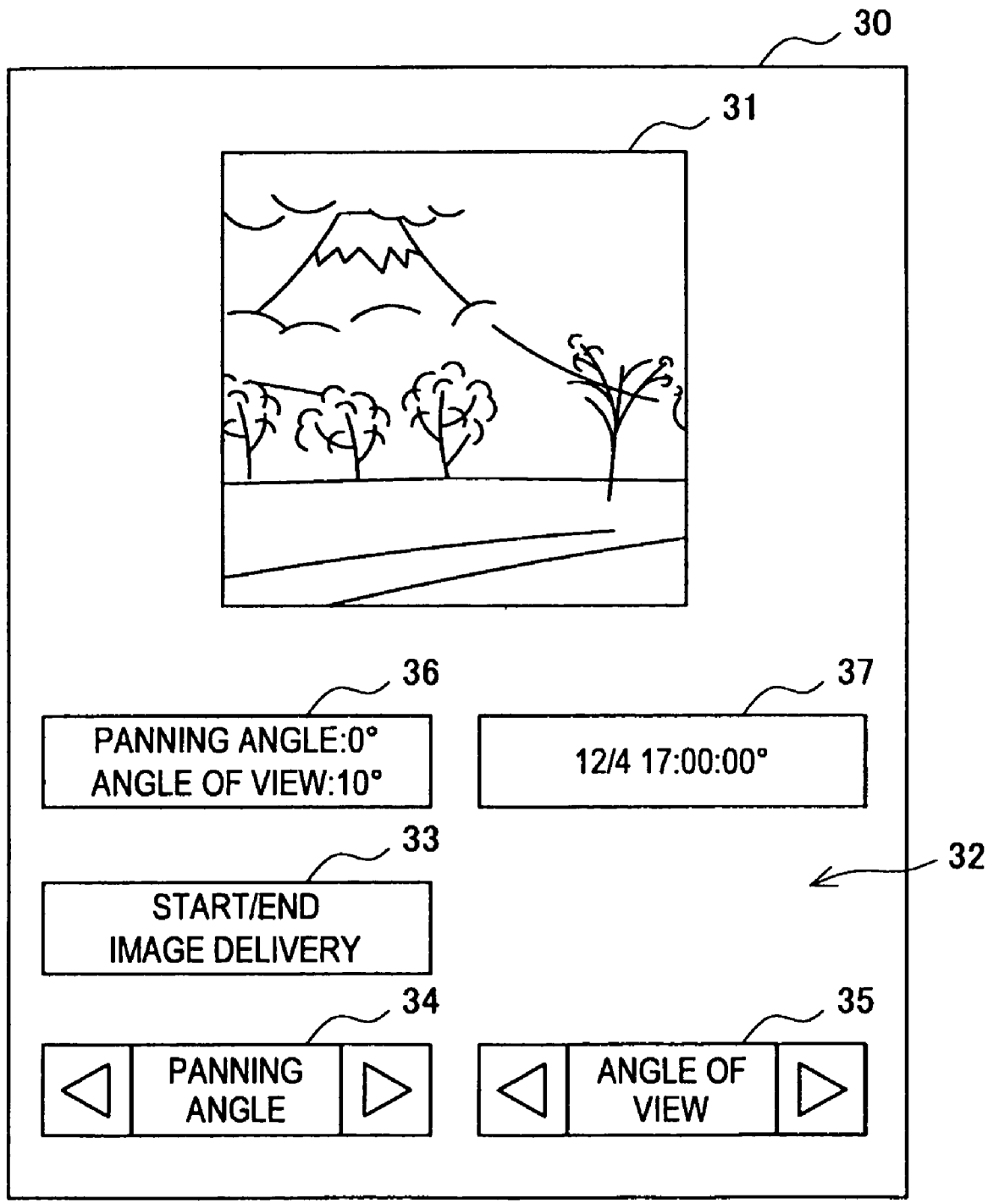
FIG. 7 is a diagram showing an example of a GUI of an image reproducing program.

Next, the GUI 30 of the image reproducing program executed in the user terminal 20 will be described with reference to FIG. 7. FIG. 7 is a diagram showing an example As shown in FIG. 7, the GUI 30 is provided with an image display area 31 and an operation panel area 32. An image shot delivered from the IP camera 10 is displayed in the image display area 31, and various operation buttons and the like is displayed in the operation panel area 32. In the operation panel area 32, an image delivery start/end button 33, a panning angle adjustment button 34, an angle of view adjustment button 35, current values 36 of operation information (panning angle, angle of view), a shooting date/time 37 of a image shot and the like are displayed.

If the image delivery start button 33 is operated while no session is established with the IP camera 10, the control unit 26 is notified of a session initiation instruction and then, the first communication processing unit 24 is notified of the session initiation instruction from the control unit 26. If the image delivery end button 33 is operated while a session is established with the IP camera 10, the first communication processing unit 24 is similarly notified of a session end instruction. Then, call control processing necessary for initiating/ending a session is performed between the user terminal 20 and the IP camera 10 via the SIP server 4.

When the panning angle adjustment button 34 or the angle of view adjustment button 35 is operated, the control unit 26 is notified of the update instruction of the operation information, and the operation information corresponding to the operation of the adjustment button is generated by the control unit 26, and the operation information is transmitted to the IP camera 10 via the second communication processing unit 25. Here, the control unit 26 generates operation information indicating desired shooting conditions by adjusting the panning angle in accordance with the operation of the panning angle adjustment button 34 or the angle of view in accordance with the operation of the angle of view adjustment button 35.

For the shooting pattern shown in FIG. 4, for example, if the initial values of operation information are: panning angle=0° and angle of view=10° (shooting condition C7, 1), the operation information is updated to the panning angle=15° and angle of view=10° (shooting condition C8, 1) if the panning angle is incremented by one unit. Similarly, if the angle of view is incremented by one unit, the operation information is updated to the panning angle=0° and angle of view=20° (shooting condition C7, 2). In this case, information of the shooting pattern is shared by the IP camera and the user terminal 20 as a shooting pattern table associating the panning angle and angle of view and shooting conditions or the like.

Incidentally, the control unit 26 may generate operation information indicating an increase/decrease of the panning angle and/or that of the angle of view. In such a case, the IP camera 10 determines shooting conditions based on operation information of the user terminal 20 contained in the operation information list T and operation information generated by the control unit 26.

[2-6. Operation Method of the IP Camera 10]

Figure 8:
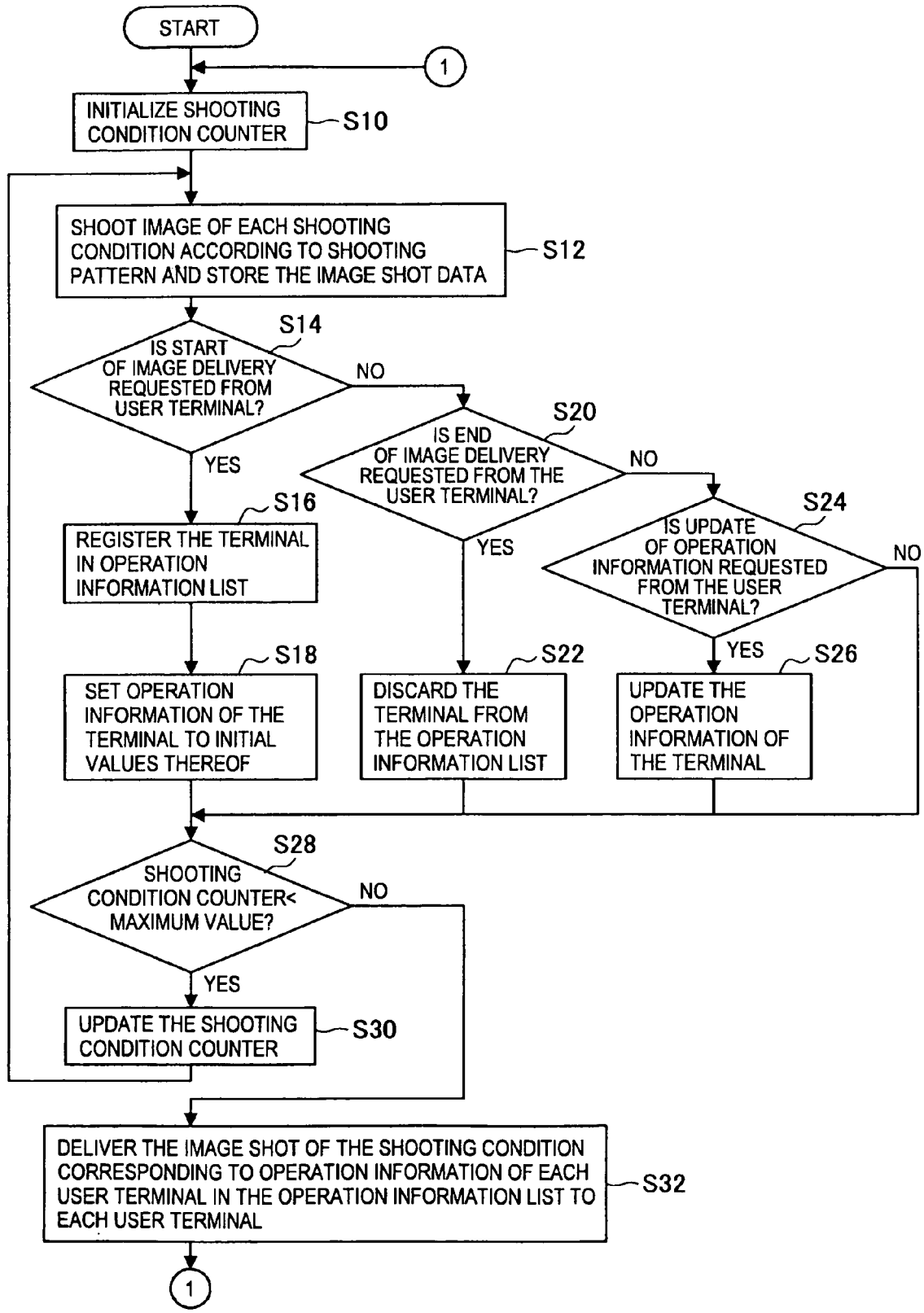
FIG. 8 is a flow chart showing an operation method of the IP camera according to the first embodiment.

Next, the operation method of the IP camera 10 according to the first embodiment will be described with reference to FIG. 8. FIG. 8 is a flow chart showing the operation method of the IP camera 10 according to the first embodiment.

When the IP camera 10 is activated, the control unit 18 starts image delivery by controlling each unit. The control unit 18 initializes (Cs=1) a shooting condition counter Cs (step S10). The control unit 18 determines a shooting condition corresponding to the counter Cs from a shooting pattern stored in the pattern storage unit 13 and outputs the shooting condition to the camera control unit 12.

The camera control unit 12 controls the panning mechanism and zooming adjustment function of the camera unit so as to meet the shooting condition and controls the camera unit 11 so that the camera unit 11 shoots a image shot corresponding to the shooting condition and generates and outputs data of the image shot to the image storage unit 14. The image storage unit 14 stores image shot data output from the camera unit 11 (S12). For the shooting pattern shown in FIG. 4, a image shot corresponding to the shooting condition C1, 1 is shot with the counter Cs=1 and image shot data is generated and stored.

When shooting of an image corresponding to each shooting condition and storage of image shot data are completed, the control unit 18 determines whether the counter is less than a maximum value Csmax (Csmax=52 in the shooting pattern shown in FIG. 4) (S28). If the counter Cs is less than the maximum value Csmax, the counter Cs is incremented by 1 (S30) before returning to processing at step S12 and, if the counter Cs has reached the maximum value Csmax, the control unit 18 moves to processing at step S32. That is, shooting of images and storage of image shot data are repeated in such a way that all shooting conditions contained in a shooting pattern (52 shooting conditions C1, 1 to C13, 4 for the shooting pattern shown in FIG. 4) are met.

Here, each time shooting of an image corresponding to each shooting condition and storage of image shot data are completed, the control unit 18 checks whether a start request/end request interrupt of image delivery or an update request interrupt of operation information is received from the user terminal 20 (S14, S20, S24).

When a start request interrupt of image delivery is received from the user terminal 20 (S14), the control unit 18 notifies the first communication processing unit 16 of a session start request. After a notification of the session start request is made, the first communication processing unit 16 initiates a session with the user terminal 20. Then, when a session is initiated, the operation information management unit 15 registers initial values of operation information in the operation information list T together with identification information of the user terminal 20 (S16, S18).

When an end request interrupt of image delivery is received from the user terminal 20 (S20), the control unit 18 notifies the first communication processing unit 16 of a session end request. After a notification of the session end request is made, the first communication processing unit 16 ends the session with the user terminal 20. When the session ends, the operation information management unit 15 discards or invalidates the identification information and operation information of the user terminal 20 from the operation information list T (S22).

When an update request interrupt of operation information is received from the user terminal 20 (S24), the control unit 18 notifies the operation information management unit 15 of an update instruction of operation information together with the operation information. After a notification of the update instruction is made, the operation information management unit 15 updates the operation information of the user terminal 20 contained in the operation information list T (S26).

Then, when shooting of images corresponding to all shooting conditions contained in the shooting pattern and storage of image shot data are completed, the control unit 18 delivers the image shot data to the user terminals 20 contained in the operation information list T (S32). The control unit 18 reads image shot data corresponding to the shooting condition indicated by operation information of each of the user terminals 20 from the image storage unit 14 and delivers the compressed and encoded image shot data to each of the user terminals 20 via the second communication processing unit 17.

For the operation information list T shown in FIG. 6, for example, the control unit 18 delivers image shot data corresponding to the shooting condition C7, 1 to the user terminal A, that corresponding to the shooting condition C13, to the user terminal B, and that corresponding to the shooting condition C1, 2 to the user terminal C.

Here, if a start request interrupt of image delivery is received in processing at step S14, image shot data corresponding to the operation information (initial values) of the user terminal 20 is delivered. If an end request interrupt of image delivery is received in processing at step S20, no image shot data is delivered to the user terminal 20. If an update request interrupt of operation information is received in processing at step S24, image shot data corresponding to the operation information (update value) of the user terminal 20 is delivered.

On the other hand, each of the user terminals 20 contained in the operation information list T receives image shot data of the shooting condition indicated by operation information of each of the user terminals 20 from the IP camera 10 and displays a image shot corresponding to image shot data by reproducing the image shot data.

Then, when image shots are delivered to all the user terminals 20 contained in the operation information list T, the control unit 18 returns to processing at step S10 and starts to shoot images according to the shooting pattern and store image shot data in the next shooting period.

According to the IP camera 10 according to the first embodiment, as described above, data of image shots corresponding to a plurality of shooting conditions contained in a shooting pattern and updated in a shooting period is stored. Then, data of image shots corresponding to a shooting condition indicated by operation information received from each of the user terminals 20 and updated in a predetermined period is delivered to each of the user terminals 20. Accordingly, high-quality images desired by each user can be delivered to a plurality of the user terminals 20 regardless of the control right of the IP camera 10.

Second Embodiment

The image delivery system 1 according to the second embodiment of the present invention will be described below. A description that overlaps with that of the image delivery system 1 according to the first embodiment is omitted.

[3-1. Configuration of an IP Camera 50]

Figure 9:
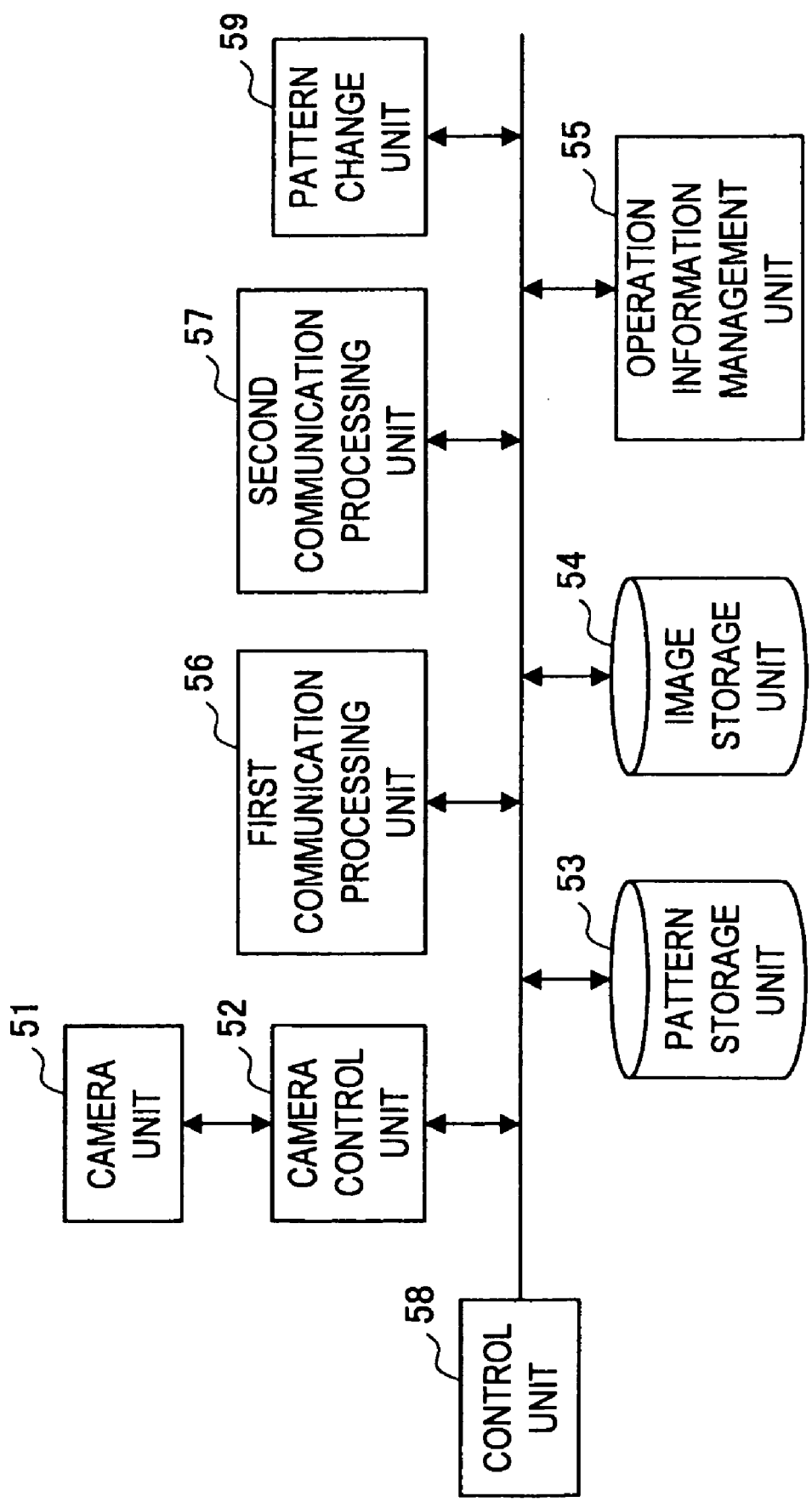
FIG. 9 is a block diagram showing main functional configurations of an IP camera according to a second embodiment.

The IP camera 50 according to the second embodiment of the present invention will be described with reference to FIG. 9. FIG. 9 is a block diagram showing main functional configurations of an IP camera 50 according to a second embodiment.

The IP camera 50 includes, in addition to a camera unit 51, a camera control unit 52, a pattern storage unit 53, an image storage unit 54, an operation information management unit 55, a first communication processing unit 56, a second communication processing unit 57, and a control unit 58, a pattern change unit 59. Here, units excluding the control unit 58 and the pattern change unit 59 function in the same manner as corresponding units of the IP camera 10 according to the first embodiment.

The control unit 58 controls each unit so that image shots are shot and delivered according to a shooting pattern in each shooting period and then, determines whether it is necessary to change the shooting pattern. The control unit 58 first determines whether operation information contained in the operation information list T has changed in the concerned shooting period. If the shooting pattern remains in the state of an initial pattern (for example, the shooting pattern shown in FIG. 4) and operation information has not changed in a predetermined number of successive shooting periods, the control unit 58 notifies the pattern change unit 59 of a change instruction to change the shooting pattern to a changed shooting pattern. If, on the other hand, operation information changes in the state of a changed pattern, the control unit 58 notifies the pattern change unit 59 of a change instruction to restore the shooting pattern to the initial pattern thereof.

After receiving a change instruction, the pattern change unit 59 decides a changed pattern and stores the changed pattern in the pattern storage unit 53 if the shooting pattern is changed to the changed pattern, and the pattern change unit 59 stores the predetermined initial pattern in the pattern storage unit 53 if the initial pattern is restored. Here, the pattern change unit 59 predicts a shooting condition desired by the user in a subsequent shooting period from the operation information of the user terminal 20 contained in the operation information list T to decide a changed pattern containing the predicted shooting condition.

[3-2. Operation Method of the IP Camera 50]

Figure 10:
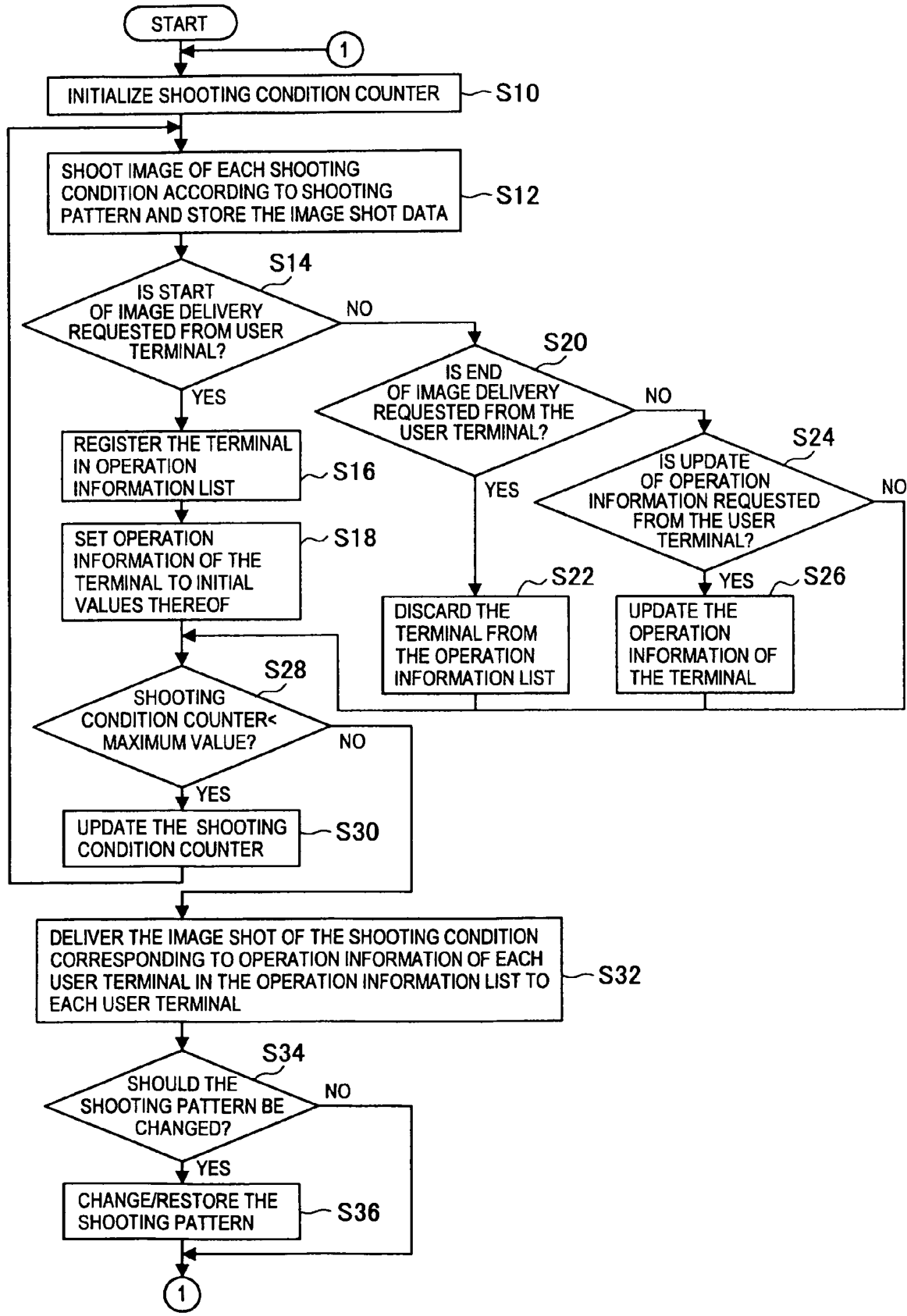
FIG. 10 is a flow chart showing an operation method of the IP camera according to the second embodiment.

Next, the operation method of the IP camera 50 according to the second embodiment will be described with reference to FIG. 10. FIG. 10 is a flow chart showing the operation method of the IP camera 50 according to the second embodiment. Processing at steps S10 to S32 is similar to that in the operation of the IP camera 10 according to the first embodiment.

The control unit 58 delivers image shot data to the user terminal 20 contained in the operation information list T in each shooting period and then, determines whether it is necessary to change the shooting pattern (S34). The control unit 58 determines, as described above, whether operation information contained in the operation information list T has changed in the concerned shooting period. Then, the control unit 58 determines whether the shooting pattern should be changed and if it is determined that the shooting pattern should be changed, the control unit 58 notifies the pattern change unit 59 of a change instruction of the shooting pattern and, if it is determined that the shooting pattern should not be changed, the control unit 58 returns to processing at step S10.

After receiving the change instruction, as described above, the pattern change unit 59 decides a changed pattern and stores the changed pattern in the pattern storage unit 53 if the shooting pattern is changed to the changed pattern, and the pattern change unit 59 stores the initial pattern in the pattern storage unit 53 if the shooting pattern is restored to the initial pattern (S36). Change processing of the shooting pattern will be described in detail below.

[3-3. Change Processing of the Shooting Pattern]

Figure 11:
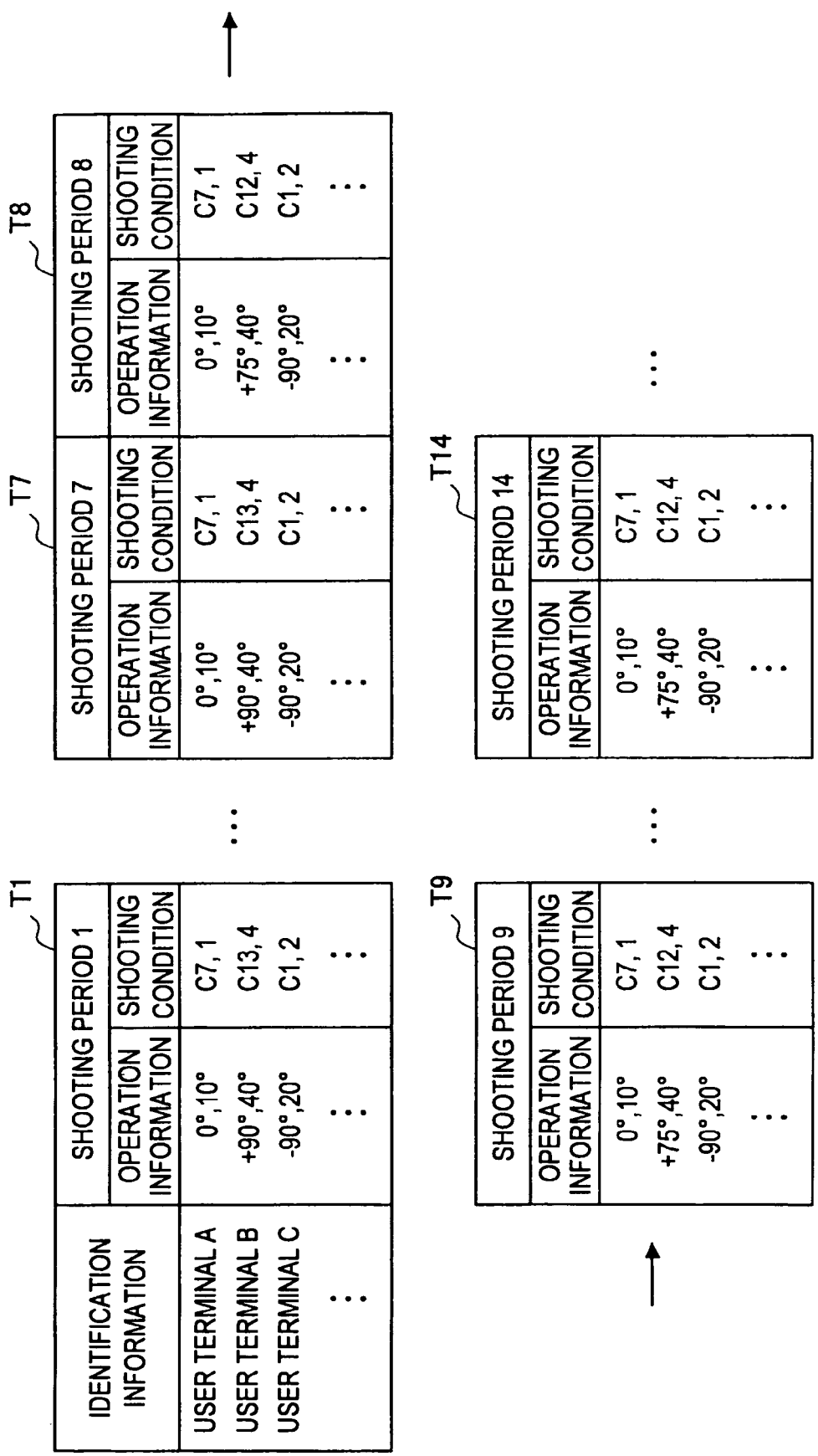
FIG. 11 is a diagram showing a change history of operation information corresponding to a plurality of shooting periods.

Next, change processing of the shooting pattern will be described with reference to FIGS. 11 to 15 using a concrete example. FIG. 11 is a diagram showing a change history of operation information corresponding to a plurality of shooting periods and FIGS. 12 to 15 are diagrams schematically showing change processing of the shooting pattern.

In FIGS. 12 to 15, shooting conditions for the IP camera 50 to shoot an image are denoted by black circles and those for the IP camera 50 not to shoot an image by white circles. Shooting conditions indicated by operation information of the user terminals A, B, and C are denoted by symbols A, B, and C respectively.

As shown in shooting information lists T1 and T7 of FIG. 11, shooting conditions indicated by operation information of the user terminals A, B, and C are C7, 1, C13, 4, and C1, 2 and fixed in the first to seventh shooting periods. Then, as shown in a shooting information list T8, the shooting condition indicated by the operation information of the user terminal 20B is changed from C13, 4 to C12, 4 in the eighth shooting period.

Here, the control unit 58 sets the shooting pattern to the initial pattern when the IP camera is activated and, if the operation information is not changed in the five successive shooting periods, it is assumed that the control unit 58 notifies the pattern change unit 59 of a change instruction to change the shooting pattern to a changed pattern.

The control unit 58 initializes a determination counter Cj (Cj=0) when the IP camera 50 is activated. Each time a shooting period ends, the control unit 58 increments the determination counter Cj by 1 if the operation information does not change in the concerned shooting period, and the control unit 58 initializes the determination counter Cj (Cj=0) if the operation information changes. Then, when the determination counter Cj reaches Cj=5, the control unit 58 determines that the operation information has not changed in five successive shooting periods and then, initializes the determination counter Cj and makes a notification of change instruction.

Figure 12:
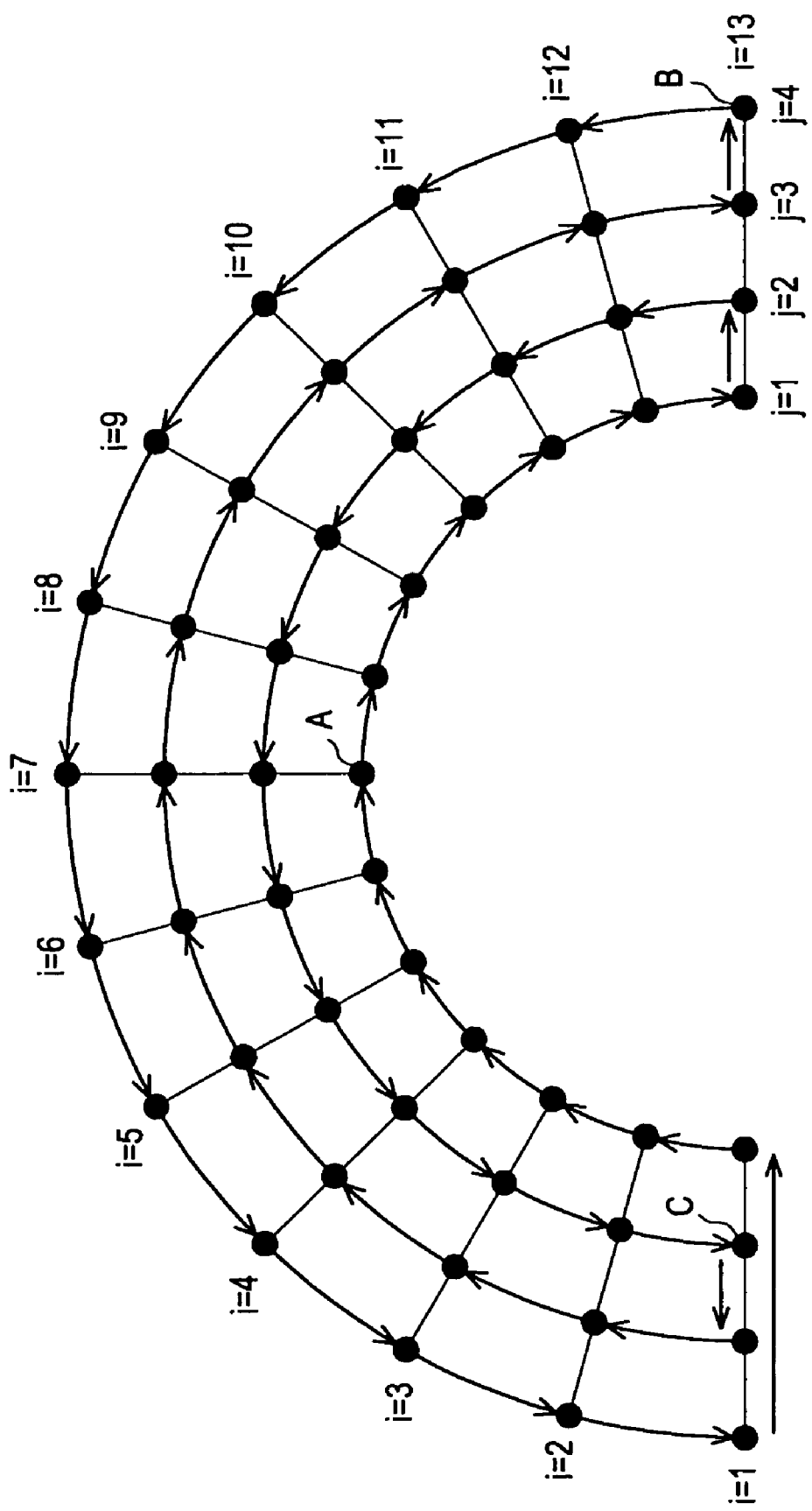
FIG. 12 is a diagram schematically showing an example of change processing of the shooting pattern.

As shown in FIG. 12, the control unit 58 controls each unit so that image shots corresponding to 52 shooting conditions C1, 1 to C13, 4 are shot according to the initial pattern stored in the pattern storage unit 53 and delivered to the user terminals A to C in the first to fifth shooting periods. Here, if the initial pattern shown in FIG. 12 is used, the shooting period becomes 2.6 sec. Then, when the fifth shooting period ends, because the operation information has not changed in the first to fifth shooting periods, the control unit 58 determines that the shooting pattern should be changed to a changed pattern and notifies the pattern change unit 59 of a change instruction.

After receiving the change instruction, the pattern change unit 59 predicts a shooting condition desired by the user in the sixth shooting period from operation information of the user terminals A to C contained in an operation information list T5 in the fifth shooting period. The pattern change unit 59 decides the changed pattern in such a way that the shooting condition indicated by operation information in the fifth shooting period and a shooting condition adjacent to the shooting condition (panning angle, angle of view) indicated by the operation information are contained.

Figure 13:
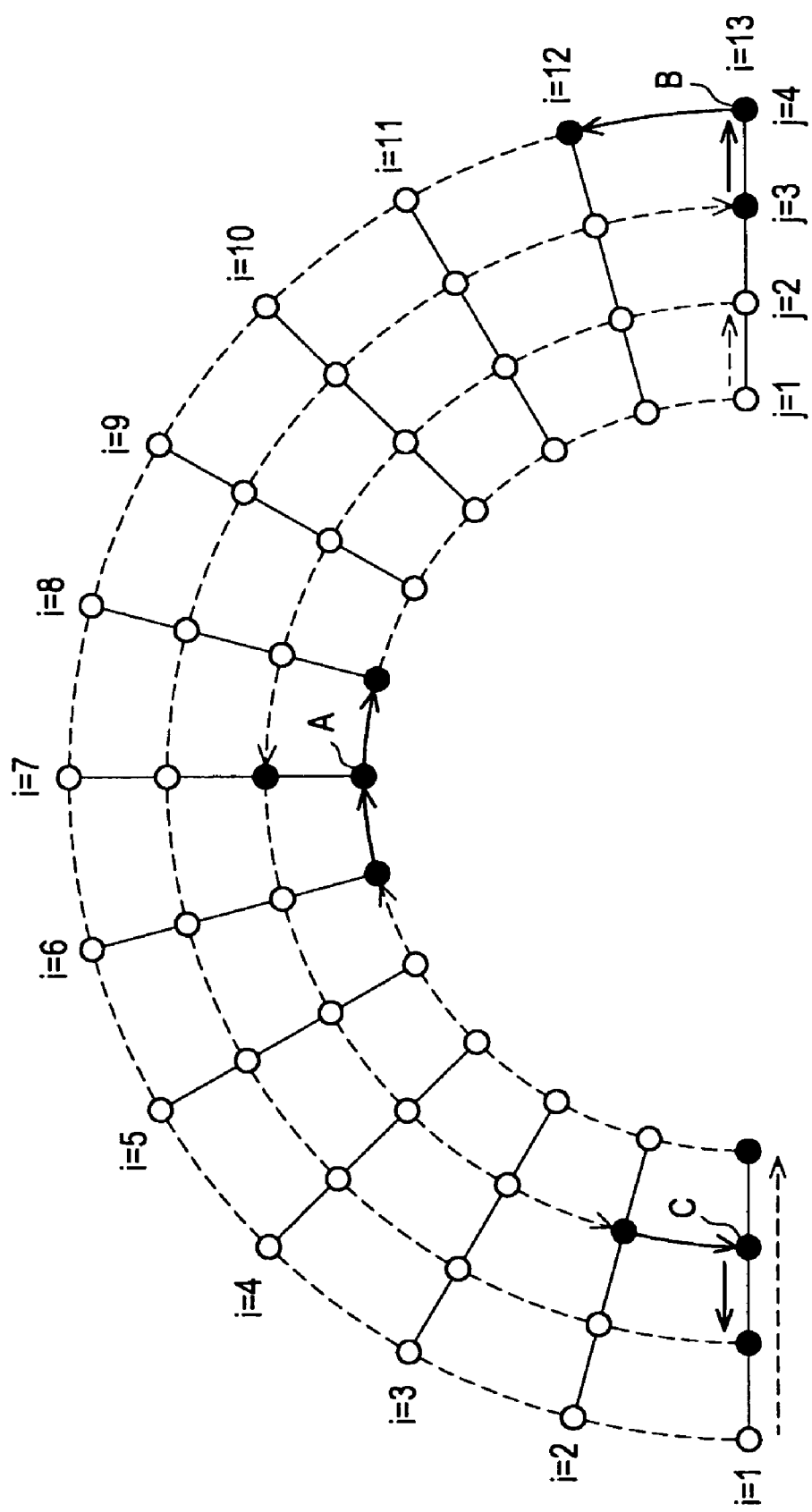
FIG. 13 is a diagram schematically showing an example of change processing of the shooting pattern.

For example, as shown in FIG. 13, the shooting conditions C7, 1, C6, 1, and C8, 1 in which the panning angle is the same or adjacent and the shooting condition C7, 2 in which the angle of view is adjacent are selected based on the shooting condition C7, 1 indicated by operation information of the user terminal A as shooting conditions contained in a changed pattern. Similarly, the shooting conditions C13, 4, C12, 4, and C13, 3 are selected based on the shooting condition C13, 4 indicated by operation information of the user terminal B and the shooting conditions C1, 2, C2, 2, C1, 1, and C1, 3 are selected based on the shooting condition C1, 2 indicated by operation information of the user terminal C. The above shooting conditions are shown only as examples of shooting conditions contained in a changed pattern and other shooting conditions may also be selected.

The pattern change unit 59 generates a changed pattern containing the shooting conditions C1, 1, C6, 1, C7, 1, C8, 1, C1, 2, C2, 2, C7, 2, C1, 3, C13, 3, C12, 4, and C13, 4 and stores the changed pattern in the pattern storage unit 53.

As shown in FIG. 13, the control unit 58 controls each unit so that image shots corresponding to 11 shooting conditions are shot according to the changed pattern stored in the pattern storage unit 53 and delivered to the user terminals A to C in the sixth to eighth shooting periods. Here, if the changed pattern shown in FIG. 13 is used, the shooting period becomes 0.55 sec. Then, when the eighth shooting period ends, because the shooting condition indicated by the operation information of the user terminal B was changed from C13, 4 to C12, 4 in the eighth shooting period, the control unit 58 determines that the shooting pattern should be restored to the initial pattern and notifies the pattern change unit 59 of a change instruction.

Here, since the changed pattern shown in FIG. 13 contains the shooting condition C12, 4, an image corresponding to the concerned shooting condition is shot and image shot data thereof is stored in the eighth shooting period. Thus, the control unit 58, can deliver image shot data corresponding to the shooting condition desired by the user to the user terminal B. If no image shot data corresponding to the shooting condition desired by the user is stored, the control unit 58 may not deliver image shot data to the user terminal B in the concerned shooting period or may deliver image shot data corresponding to a shooting condition adjacent to the shooting condition desired by the user.

After receiving the change instruction, the pattern change unit 59 restores the shooting pattern to the initial pattern from the changed pattern and stores the initial pattern in the pattern storage unit 53.

Figure 14:
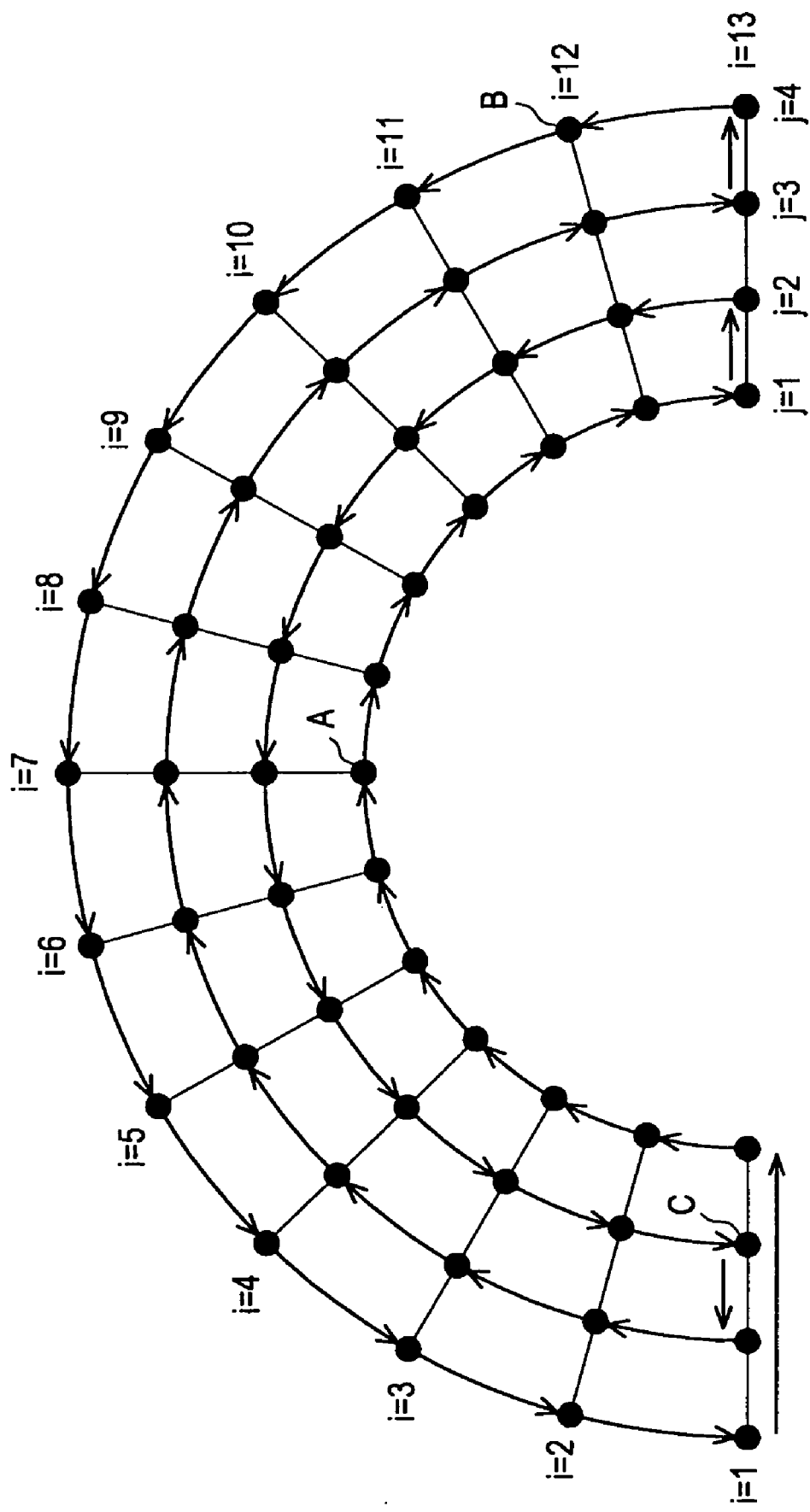
FIG. 14 is a diagram schematically showing an example of change processing of the shooting pattern.

As shown in FIG. 14, the control unit 58 controls each unit so that image shots corresponding to 52 shooting conditions C1, 1 to C13, 4 are shot according to the initial pattern stored in the pattern storage unit 53 and delivered to the user terminals A to C in the ninth to thirteenth shooting periods. Here, if the initial pattern shown in FIG. 14 is used, the shooting period becomes 2.6 sec again. Then, when the thirteenth shooting period ends, because the operation information has not changed in the ninth to thirteenth shooting periods, the control unit 58 determines that the shooting pattern should be changed to a changed pattern and notifies the pattern change unit 59 of a change instruction.

After receiving the change instruction, like in the fifth shooting period, the pattern change unit 59 predicts a shooting condition desired by the user in the fourteenth shooting period from operation information of the user terminals A to C contained in an operation information list T13.

Figure 15:
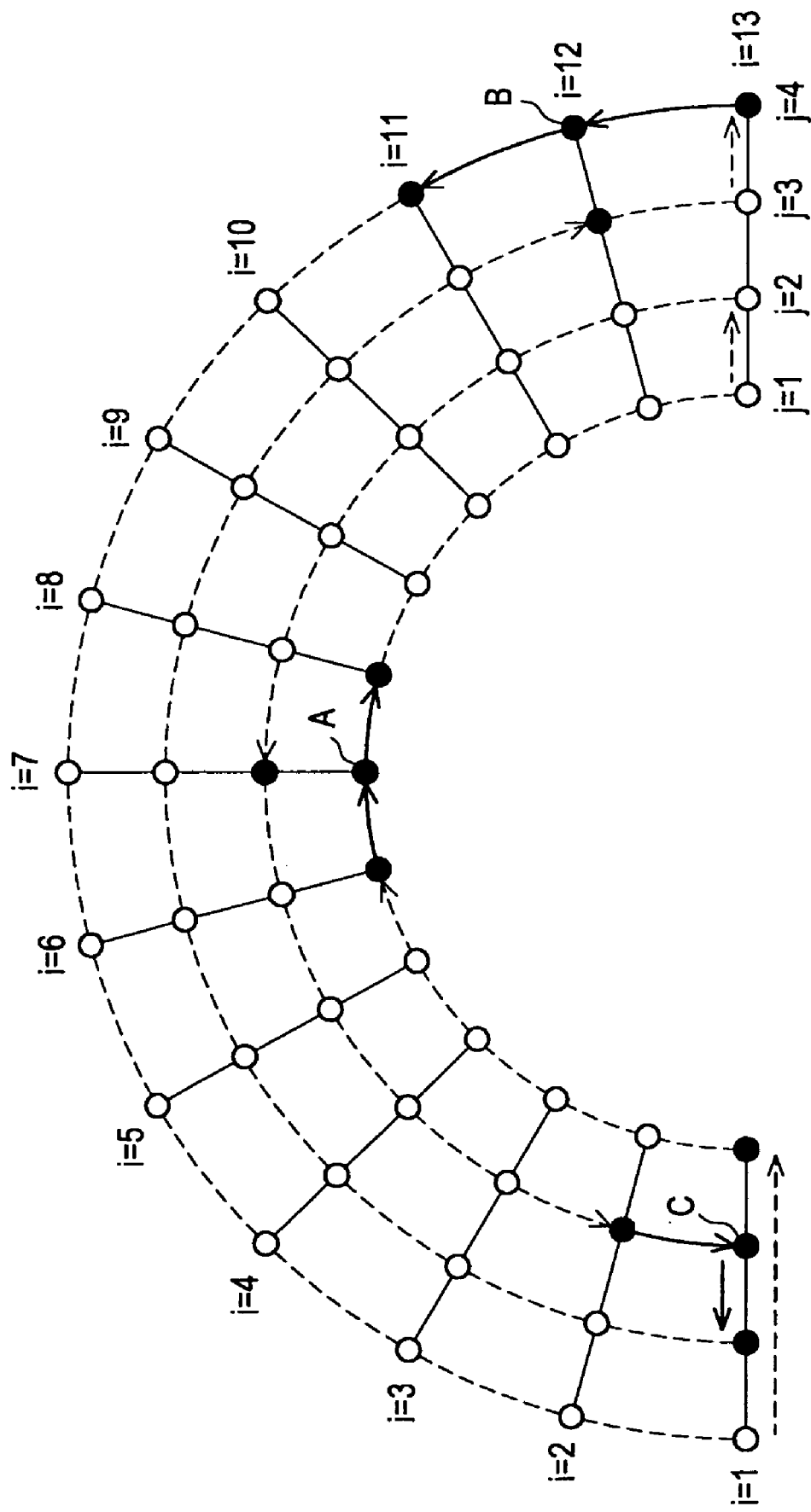
FIG. 15 is a diagram schematically showing an example of change processing of the shooting pattern.

For example, as shown in FIG. 15, a changed pattern containing the shooting conditions C1, 1, C6, 1, C7, 1, C8, 1, C1, 2, C2, 2, C7, 2, C1, 3, C12, 3, C11, 4, C12, 4, and C13, 4 is generated based on the shooting conditions C7, 1, C12, 4, and C1, 2 indicated by operation information of the user terminals A, B, and C and stored in the pattern storage unit 53.

As shown in FIG. 15, the control unit 58 controls each unit so that image shots corresponding to 11 shooting conditions are shot according to the changed pattern stored in the pattern storage unit 53 and delivered to the user terminals A to C in the fourteenth and subsequent shooting periods. Here, if the changed pattern shown in FIG. 15 is used, the shooting period becomes 0.55 sec.

According to the IP camera 50 according to the second embodiment, as described above, shooting of image shots, storage of image shot data, and delivery of image shots can efficiently be carried out according to a shooting pattern changed so as to contain a shooting condition assumed to be desired by a user.

It should be understood by those skilled in the art that various modifications, combinations, sub-combinations and alterations may occur depending on design requirements and other factors insofar as they are within the scope of the appended claims or the equivalents thereof.

In the above description, for example, data of image shots shot corresponding to the plurality of shooting conditions contained in a shooting pattern and updated in a predetermined period is stored by the single IP camera 10, 50. However, data of image shots shot corresponding to the plurality of shooting conditions contained in a shooting pattern and updated in a predetermined period may be stored by two or more IP cameras.

In such a case, the plurality of shooting conditions contained in a shooting pattern is divided into two shooting condition groups or more, and two or more IP cameras each shoot images corresponding to shooting conditions contained in each shooting condition group and transmit images to an image delivery server or the like while updating the images in a predetermined period. The image delivery server stores image shot data transmitted from two or more IP cameras. Then, the image delivery server delivers data of image shots corresponding to the shooting condition indicated by operation information received from each of the user terminals 20 and updated in the predetermined period to each of the user terminals 20 in the predetermined period.

Accordingly, the plurality of shooting conditions contained in the shooting pattern is divided into two shooting condition groups or more and image shots corresponding to shooting conditions contained in each shooting condition group are shot by each of two or more IP cameras and therefore, the delivery period of image shots can be reduced.

The present application contains subject matter related to that disclosed in Japanese Priority Patent Application JP 2008-324230 filed in the Japan Patent Office on December 2008, the entire content of which is hereby incorporated by reference.

What is claimed is:

1. An image delivery apparatus, comprising:
   a camera unit capable of changing a shooting condition specified by a shooting direction and/or an angle of view;
   a camera control unit that causes the camera unit to shoot image shots corresponding to a plurality of shooting conditions in a predetermined period according to a shooting pattern containing the plurality of mutually different shooting conditions and having the predetermined period;
   an image storage unit that stores data of image shots shot corresponding to the plurality of shooting conditions and updated in the predetermined period;
   an operation information receiving unit that receives operation information indicating any shooting condition contained in the shooting pattern from one image reproducing apparatus or more;
   an image delivery unit that delivers data of image shots corresponding to the shooting condition indicated by the operation information received from each of the image reproducing apparatuses and updated in the predetermined period to each of the image reproducing apparatuses; and
   a shooting pattern change unit that predicts the operation information that could be received from the image reproducing apparatuses based on the operation information received from the image reproducing apparatuses and changes the shooting pattern so that the shooting condition indicated by the predicted operation information is included.

2. An image delivery system including an image delivery apparatus and one image reproducing apparatus or more, wherein
   the image delivery apparatus, comprises:
   a camera unit capable of changing a shooting condition specified by a shooting direction and/or an angle of view;
   a camera control unit that causes the camera unit to shoot image shots corresponding to a plurality of shooting conditions in a predetermined period according to a shooting pattern containing the plurality of mutually different shooting conditions and having the predetermined period;
   an image storage unit that stores data of image shots shot corresponding to the plurality of shooting conditions and updated in the predetermined period;
   an operation information receiving unit that receives operation information indicating any shooting condition contained in the shooting pattern from one image reproducing apparatus or more;
   an image delivery unit that delivers data of image shots corresponding to the shooting condition indicated by the operation information received from each of the image reproducing apparatuses and updated in the predetermined period to each of the image reproducingapparatuses; and
   a shooting pattern change unit that predicts the operation information that could be received from the image reproducing apparatuses based on the operation information received from the image reproducing apparatuses and changes the shooting pattern so that the shooting condition indicated by the predicted operation information is included, and
   the image reproducing apparatus, includes:
   an operation information transmitting unit that transmits the operation information to the image delivery apparatus;
   an image receiving unit that receives data of image shots corresponding to the shooting condition indicated by the operation information and updated in the predetermined period from the image delivery apparatus; and
   an image reproducing unit that reproduces data of image shots received from the image delivery apparatus.

3. An image delivery method, comprising the steps of:
   shooting image shots corresponding to a plurality of shooting conditions in a predetermined period according to a shooting pattern containing the plurality of shooting conditions involving a change of a shooting direction and/or an angle of view and having the predetermined period;
   storing data of image shots shot corresponding to the plurality of shooting conditions and updated in the predetermined period;
   receiving operation information indicating any shooting condition contained in the shooting pattern from one image reproducing apparatus or more;
   delivering data of image shots corresponding to the shooting condition indicated by the operation information received from each of the image reproducing apparatuses and updated in the predetermined period to each of the image reproducing apparatuses; and predicting the operation information that could be received from the image reproducing apparatuses based on the operation information received from the image reproducing apparatuses and changing the shooting pattern so that the shooting condition indicated by the predicted operation information is included.

4. A non-transitory computer readable memory having stored thereon a program for causing a computer to execute an image delivery method, comprising the steps of:

shooting image shots corresponding to a plurality of shooting conditions in a predetermined period according to a shooting pattern containing the plurality of shooting conditions involving a change of a shooting direction and/or an angle of view and having the predetermined period;

storing data of image shots shot corresponding to the plurality of shooting conditions and updated in the predetermined period;

receiving operation information indicating any shooting condition contained in the shooting pattern from one image reproducing apparatus or more;

delivering data of image shots corresponding to the shooting condition indicated by the operation information received from each of the image reproducing apparatuses and updated in the predetermined period to each of the image reproducing apparatuses; and predicting the operation information that could be received from the image reproducing apparatuses based on the operation information received from the image reproducing apparatuses and changing the shooting pattern so that the shooting condition indicated by the predicted operation information is included.

* * * * *